Feb. 26, 1963   J. PICKLES   3,079,118
SEAT ADJUSTING MECHANISM
Filed Dec. 13, 1960   3 Sheets-Sheet 1
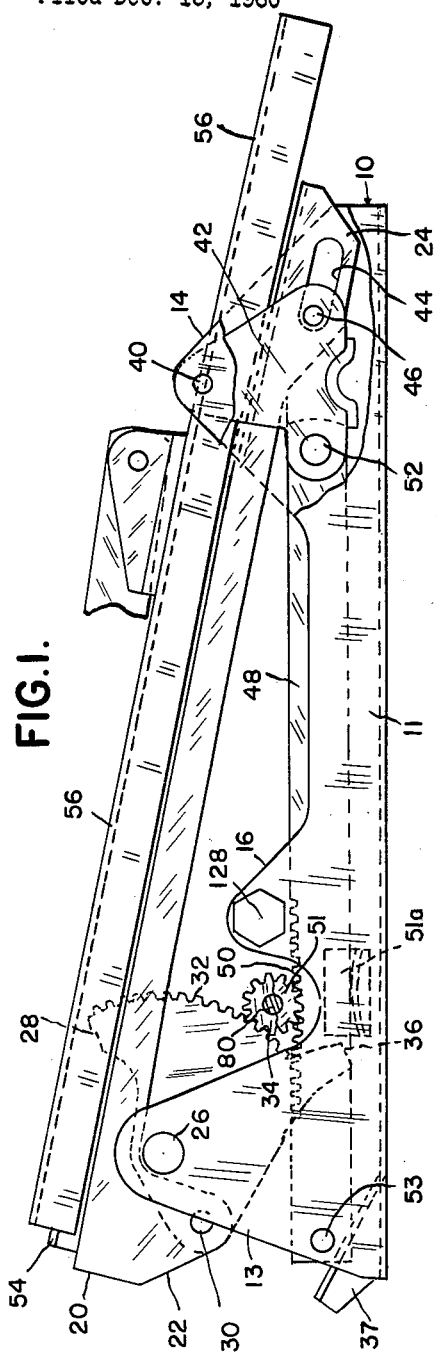
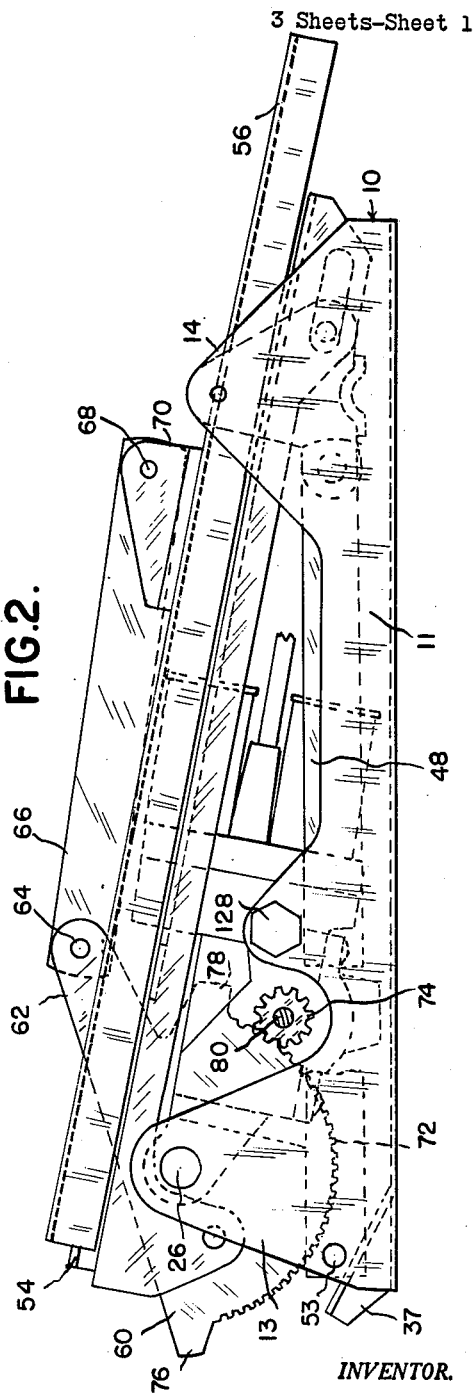
INVENTOR.
JOSEPH PICKLES
BY
ATTORNEYS Feb. 26, 1963  J. PICKLES  3,079,118
SEAT ADJUSTING MECHANISM
Filed Dec. 13, 1960  3 Sheets-Sheet 2
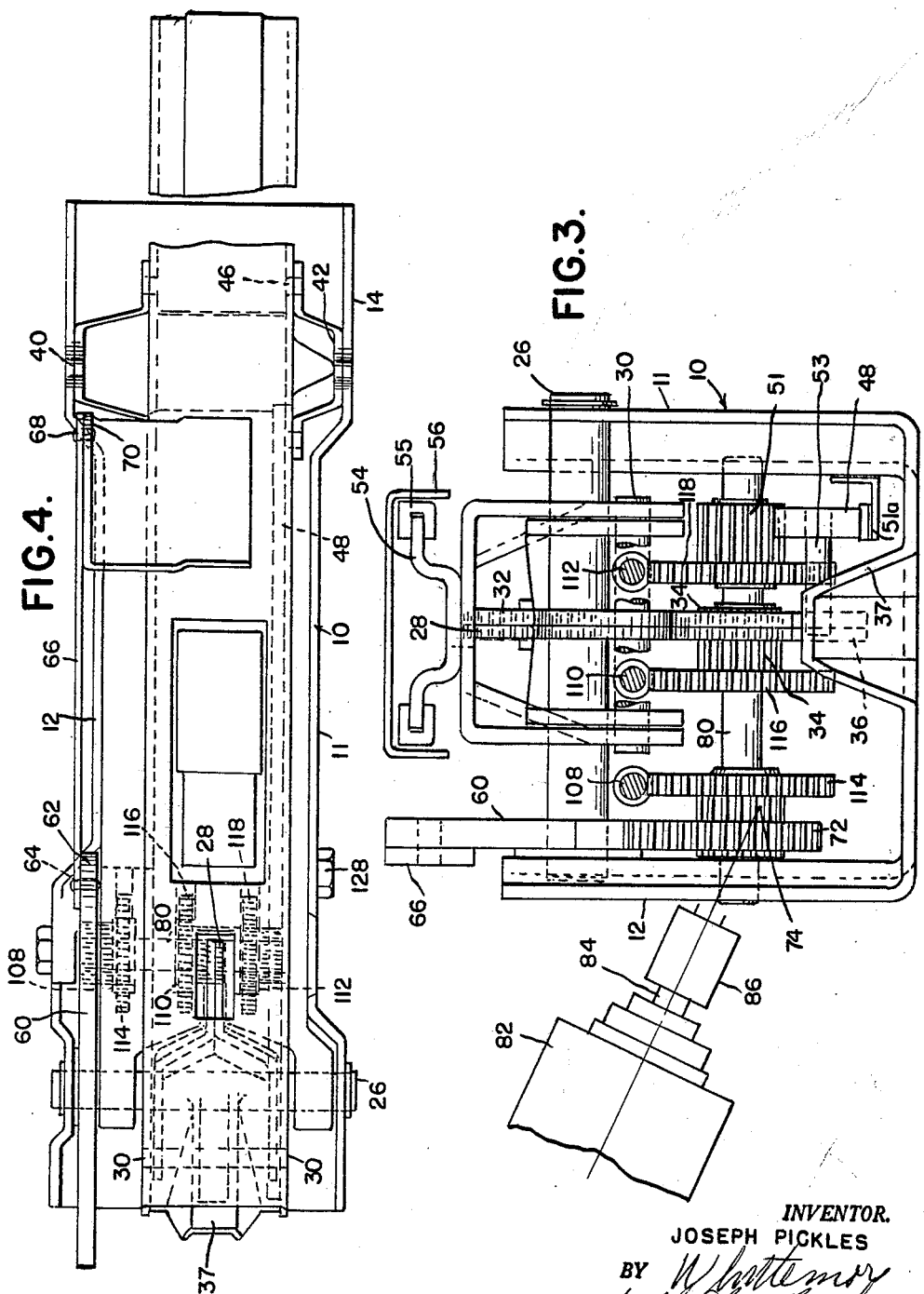
INVENTOR.
JOSEPH PICKLES
BY
Hulbert & Belknap
ATTORNEYS Feb. 26, 1963    J. PICKLES    3,079,118
SEAT ADJUSTING MECHANISM
Filed Dec. 13, 1960    3 Sheets-Sheet 3

INVENTOR.
JOSEPH PICKLES
BY
ATTORNEYS

United States Patent Office 3,079,118
Patented Feb. 26, 1963

3,079,118
SEAT ADJUSTING MECHANISM
Joseph Pickles, Dearborn, Mich., assignor to Ferro Stamping Company, Detroit, Mich., a corporation of Michigan
Filed Dec. 13, 1960, Ser. No. 75,564
9 Claims. (Cl. 248—420)

The present invention relates to seat adjusting mechanism.

It is an object of the present invention to provide seat adjusting mechanism comprising a pair of substantially identical seat adjusting devices one of which is located adjacent each end of a vehicle seat, each of said devices including means for effecting substantially vertical movement of the front end of a seat supporting bar, means for effecting substantially vertical movement of the rear end of a seat supporting bar, and means for effecting front to rear movement of the horizontal bar, each of said means including a rotary separate selectively actuable rotatable driving element.

It is a further object of the present invention to provide apparatus as described in the preceding paragraph in which said driving elements are in the form of pinions, said means including at least one rack and at least one sector connected to be driven by one of said driving elements.

It is a further object of the present invention to provide power seat adjusting mechanism comprising a rotary support, a plurality of independently rotatable pinions on said support, a bell crank having a toothed sector thereon in mesh with one of said pinions and connected to effect vertical movement of one end of a support bar, a rack in mesh with another of said pinions and connected to a second bell crank, said second bell crank being connected to the other end of said support bar for effecting up and down movement thereof, and an actuating arm having a toothed sector connected thereto in mesh with another of said pinions, and a link connecting said arm to a seat support slide mounted for fore and aft sliding movement on said support bar.

Other objects and features of the invention will become apparent as the description proceeds, especially when taken in conjunction with the accompanying drawings, illustrating preferred embodiments of the invention, wherein:

FIGURE 1 is a side elevation with parts omitted for clarity, of a seat supporting and adjusting device.

FIGURE 2 is a view similar to FIGURE 1 with different parts omitted, showing the elements necessary for obtaining a different adjustment.

FIGURE 3 is an end view of the device shown in FIGURES 1 and 2.

FIGURE 4 is a plan view of the device shown in FIGURES 1 and 2.

Figure 6:
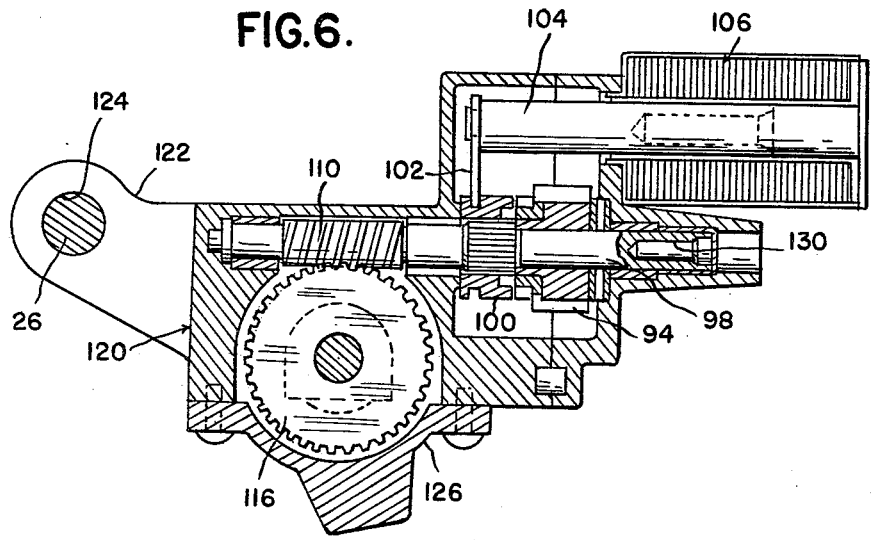
FIGURE 6 is a side elevation of the structure shown in FIGURE 5, with parts broken away.

The present invention relates to a seat supporting and adjusting construction designed primarily for use in supporting the front seat of an automotive vehicle. The seat supporting and adjusting mechanism comprises a pair of substantially identical supporting and adjusting devices, one of which is located adjacent each end of the vehicle seat. Means are provided for effecting identical movements of the movable parts of the two devices so that both ends of the seat are adjusted identically and simultaneously.

The adjustments contemplated are essentially up and down movement of the front edge of the seat, up and down movement of the rear edge of the seat, and substantially front to rear adjustment of the seat. It will of course be understood that simultaneous adjustment of the front and rear edges of the seat either upwardly or downwardly, results in vertical adjustment of the seat as a unit, whereas adjustment of one edge independently of the other results primarily in effecting a tilting adjustment of the seat.

In FIGURE 1 some of the mechanism for effecting the front to rear adjustment is omitted in order to avoid confusion. This figure illustrates primarily the mechanism which effects vertical adjustment of the front and rear edges of the seat. The device comprises essentially a fixed support bar 10 which as best seen in FIGURE 4, is in the form of an upwardly open channel having side flanges 11 and 12. The support bar 10 may be fastened to the floor of the vehicle by suitable means. The support bar 10 has adjacent its front end an upstanding post construction 13 and adjacent its rear end a similar but somewhat shorter upstanding post construction 14. Intermediate the posts 13 and 14 is a short post construction 16 whose function will presently be described.

Located above the stationary support bar 10 is an adjustable support bar 20 having at its front end a depending projection 22 and having adjacent its rear end a depending projection 24.

Adjacent the front end of the stationary bar 10 there is provided a pivot support pin 26 which extends between the separate laterally spaced portions of the post construction 13. Pivoted to the pin 26 is a lever or bell crank 28 having a pivot connection 30 with the depending projection 22 of the support bar 20. It will be apparent that as the lever 28 is swung about the axis of the pivot pin 26, the pivot connection 30 moves in an arc but the direction of movement is generally vertical. In other words, swinging movement of the lever 28 will result in substantially vertical adjustment of the front end of the support bar 20.

The lever 28 includes a toothed sector 32 which is in mesh with a pinion 34 subsequently to be described. The lever 28 also carries a stop projection 36 which is engageable with a stop projection 37 formed at the front end of the stationary bar 10 to extend upwardly therefrom to limit movement of the lever 28.

At the opposite end of the support bar 20 there is provided a pivot connection 40 by means of which a lever or bell crank 42 is pivoted to the upstanding post construction 14. The depending projection 24 of the support bar 20 is provided with an elongated slot 44 which receives a pin 46. The lost motion connection provided by the slot 44 and the pin 46 permits independent substantially vertical movement of opposite sides of the support bar 20 without binding.

Means are provided for rocking or swinging the lever 42 and this means comprises an elongated link 48 which adjacent its front end is provided with rack teeth as indicated at 50 which are adapted to mesh with a second pinion 51 and are held in mesh therewith by slidable engagement with support bracket 51a. The link is provided with a pivot connection 52 to the lever 42. It will be observed that fore and aft movement of the link 48 effects rocking movement of the lever 42 and hence, substantially vertical movement of the rear end of the support bar 20. Adjacent its forward end the link 48 is provided with a pin 53 which is engageable with a suitable part of the support device (specifically, a cover formed on the power transmission housing) to limit the back stroke of the link 48 and hence, the lifting movement of the lever 42.

Mounted on the top of the support bar 20 as best seen in FIGURE 3, are a plurality of support brackets 54 which are relatively slidably received in inwardly directed guide members 55 carried by the seat supporting slide 56.

The mechanism for effecting fore and aft movement of the seat supporting slide is best illustrated in FIGURE 2, in which figure some of the previously described actuating mechanism is omitted for clarity. As best seen in this figure, an actuating arm member 60 is pivoted on the pivot pin 26, the member including an arm 62 pivoted as indicated at 64 to a rearwardly extending link 66. The link 66 as indicated, has a pivot connection 68 with an upstanding ear 70 carried by the seat supporting slide 56.

The arm member 60 also includes a toothed sector 72 in mesh with a third pinion 74. The arm member 60 also includes stop portions 76 and 78 engageable with suitable stop means (not shown) located adjacent the axis of the pinion support shaft 80.

It will of course be apparent that the arm member 60 may be operated at any time and with the support bar 20 in any position of adjustment, and will operate to effect front to rear movement of the seat supporting slide 56 relative to the adjustable support bar 20.

Figure 5:
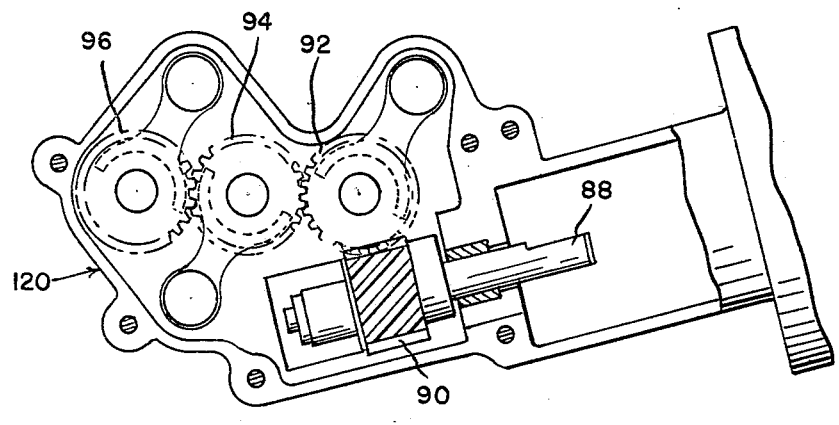
FIGURE 5 is an end view of the selectively operable power transmission with the cover removed.

Referring now to FIGURES 3, 5 and 6, the mechanism for effecting selective adjustment of the seat is illustrated. As best seen in FIGURE 3, power is derived from a motor 82 having a drive shaft 84 connected through a suitable coupling 86 to an input shaft 88 of the clutch controlled transmission. The shaft 88 is best illustrated in FIGURE 5, and as seen therein includes a drive gear 90 in mesh with a driven gear 92 which in turn meshes with a gear 94, the latter being in constant mesh with the third gear 96. Accordingly, when the motor 82 is energized the gears 92, 94 and 96 all rotate in mesh.

Each of the gears 92, 94 and 96 is rotatable upon its supporting shaft, as best seen in FIGURE 6, wherein one of the gears such for example as the gear 94, is shown as freely rotatable on drive shaft 98. Keyed to the drive shaft 98 for rotation therewith and for limited shifting movement thereon is a clutch element 100 connected by a fork 102 to the armature 104 of a solenoid indicated generally at 106. It will be understood that when the solenoid is energized to move the armature 104 to the right, the clutch 100 engages correspondingly shaped clutch teeth on the gear 94 and hence, rotation is imparted to the shaft 98. Carried by the three shafts (such as the shaft 98) mounting the gears 92, 94 and 96, are worms 108, 110 and 112 in mesh respectively with worm gears 114, 116 and 118 each mounted for free rotation on the support shaft 80. The worm gear 114 is rigidly connected to or integral with the pinion 74 which drives the arm member 60. The worm gear 116 is rigidly connected to or integral with the pinion 34 which drives the lever or bell crank 28. The worm gear 118 is rigidly connected to or integral with the pinion 51 which meshes with the rack teeth 50 of the link 48.

The transmission is included in housing structure indicated generally at 120 and this structure includes a forwardly extending ear 122 provided with an opening 124. This forwardly extending ear is seen in FIGURE 1 to be positioned so as to receive the pivot pin 26. The housing 120 includes a removable cap 126. The transmission housing 120 is retained in position by a screw 128 extending through the upstanding post 16 formed on the stationary bar 10.

Referring again to FIGURE 6, it will be observed that the shaft 98 which carries one of the worms 108, 110 or 112, is recessed at one end as indicated at 130 for the reception of one end of a flexible drive cable. This cable extends across the vehicle to the seat supporting and adjusting device at the other end of the seat where it connects to a worm similar to the worm 110, in mesh with a worm gear similar to the worm gear 116. In other words, a motor and clutch construction is associated with a set of three worm and worm gear combinations in one of the devices. In the companion device the motor connection, the gears corresponding to the gears 92, 94 and 96 are omitted, and actuation is accomplished by rotation of shafts similar to the shafts 98, each of which is associated with a worm gear equivalent to one of the worm gears 108, 110 and 112. Accordingly, opposite ends of the seat are adjusted simultaneously in exactly the same degree so that binding of the seat support mechanism cannot occur.

The drawings and the foregoing specification constitute a description of the improved seat adjusting mechanism in such full, clear, concise and exact terms as to enable any person skilled in the art to practice the invention, the scope of which is indicated by the appended claims.

What I claim as my invention is:

1. Power seat supporting and adjusting mechanism comprising a pair of similar devices at opposite ends of a vehicle seat, each of said devices comprising three elongated superimposed members adapted to be mounted between the floor of an automobile and one end of a vehicle seat and to extend fore and aft of the vehicle, said three members comprising a fixed base member, an upper seat support member, and an intermediate member, a first one of said members being mounted for longitudinal sliding movement on a next adjacent member, adjustable lift mechanism connected between the opposite ends of a second one of said members and a next adjacent member, a support shaft carried by one of said members and extending transversely thereof, a plurality of pinions carried by said shaft for independent rotation, power means for selectively driving said pinions in rotation, means connecting one of said pinions to said lift mechanism, and actuating means including another of said pinions extending between the said second one of said members and a support with respect to which said second member is longitudinally movable.

2. Power seat supporting and adjusting mechanism comprising a pair of similar devices at opposite ends of a vehicle seat, each of said devices comprising three elongated superimposed members adapted to be mounted between the floor of an automobile and one end of a vehicle seat and to extend fore and aft of the vehicle, said three members comprising a fixed base member, an upper seat support member, and an intermediate member, a first one of said members being mounted for longitudinal sliding movement on a next adjacent member, lift levers connected between the opposite ends of a second one of said members and a next adjacent member, a cross shaft adjacent one end of said members, a plurality of independently rotatable pinions on said shaft, power means for selectively driving said pinions in forward and reverse rotation, a toothed sector connected to one of said lift levers in mesh with one of said pinions, and a link having rack teeth in mesh with another of said pinions and connected to said other lever.

3. Power seat supporting and adjusting mechanism comprising a pair of similar devices at opposite ends of a vehicle seat, each of said devices comprising three elongated superimposed members adapted to be mounted between the floor of an automobile and one end of a vehicle seat and to extend fore and aft of the vehicle, said three members comprising a fixed base member, an upper seat support member, and an intermediate member, a first one of said members being mounted for longitudinal sliding movement on a next adjacent member, lift levers connected between the opposite ends of a second one of said members and a next adjacent member, a cross shaft adjacent one end of said members, a plurality of independently rotatable pinions on said shaft, power means for selectively driving said pinions in forward and reverse rotation, a toothed sector connected to one of said lift levers in mesh with one of said pinions, a link having rack teeth in mesh with another of said pinions and connected to said other lever, and traverse means including a toothed drive member in mesh with yet another of said pinions and connected to said first slidable member.

4. Power seat supporting and adjusting mechanism comprising a pair of similar devices at opposite ends of a vehicle seat, each of said devices comprising three elongated superimposed members adapted to be mounted between the floor of an automobile and one end of a vehicle seat and to extend fore and aft of the vehicle, said three members comprising a fixed base member, an upper seat support member, and an intermediate member, a first one of said members being mounted for longitudinal sliding movement on a next adjacent member, lift levers connected between the opposite ends of a second one of said members and a next adjacent member, a cross shaft adjacent one end of said members, a plurality of independently rotatable pinions on said shaft, power means for selectively driving said pinions in forward and reverse rotation, a toothed sector connected to one of said lift levers in mesh with one of said pinions, a link having rack teeth in mesh with another of said pinions and connected to said other lever, and traverse means including a toothed sector in mesh with yet another of said pinions and having an arm, and a link connecting said arm to said first slidable member.

5. Power seat supporting and adjusting mechanism comprising a pair of similar devices at opposite ends of a vehicle seat, each of said devices comprising a fixed bottom support member, an intermediate elongated member, a pair of levers connecting opposite ends of said intermediate member to corresponding ends of said bottom support member, an upper seat support member slidable on said intermediate member, a transverse shaft on said bottom support member, three pinions mounted on said shaft for independent forward and reverse rotation, a first toothed sector connected to one of said pair of levers in mesh with one of said pinions, a link having a rack portion in mesh with another of said pinions and pivotally connected to the other of said pair of levers, and traverse mechanism including a toothed member in mesh with the third of said pinions connected to said upper slidable seat support member.

6. Power seat supporting and adjusting mechanism comprising a pair of similar devices at opposite ends of a vehicle seat, each of said devices comprising a fixed bottom support member, an intermediate elongated member, a pair of levers connecting opposite ends of said intermediate member to corresponding ends of said bottom support member, an upper seat support member slidable on said intermediate member, a transverse shaft on said bottom support member, three pinions mounted on said shaft for independent forward and reverse rotation, a first toothed sector connected to one of said pair of levers in mesh with one of said pinions, a link having a rack portion in mesh with another of said pinions and pivotally connected to the other of said pair of levers, and traverse mechanism including a second toothed sector in mesh with the third one of said pinions, said second sector having an actuating arm, and a link connecting said arm to said upper slidable seat support member.

7. Seat support mechanism comprising an elongated, generally horizontal, vertically adjustable member, a seat support slide adjustable longitudinally on said member, lift levers connected to the front and rear ends of said member, a stationary support shaft, a plurality of pinions mounted on said shaft for independent forward and reverse rotation, and power actuating means including toothed members comprising one toothed sector and one rack each in mesh with one of said pinions and connected respectively to said lift levers, and a second toothed sector in mesh with one of said pinions, and a link connecting said second sector to said seat support slide.

8. Seat support mechanism comprising an elongated, generally horizontal, vertically adjustable member, a seat support slide adjustable longitudinally on said member, lift levers connected to the front and rear ends of said member, a stationary support shaft, a plurality of pinions mounted on said shaft for independent forward and reverse rotation, a single motor, and selectively operable transmission means connecting said motor to each of said pinions, and power actuating means including toothed members comprising a first toothed sector and a rack each in mesh with one of said pinions and connected respectively to said lift levers, and a second toothed sector in mesh with one of said pinions, and a link connecting said second sector to said seat support slide.

9. Power seat supporting and adjusting mechanism comprising a pair of similar devices at opposite ends of a vehicle seat, each of said devices comprising a fixed bottom support member, an intermediate elongated member, a pair of levers connecting opposite ends of said intermediate member to corresponding ends of said bottom support member, an upper seat support member slidable on said intermediate member, power means for effecting substantially vertical adjustment of said intermediate member, including a drive shaft mounted in a fixed position relative to said bottom member, a toothed drive member on said shaft, a toothed driven member mounted for rotation in a fixed position relative to said bottom member and in mesh with said drive member, and a link pivotally connected between said driven member and said seat support member to provide for fore and aft sliding movement thereof in any position of vertical adjustment of said intermediate member.

References Cited in the file of this patent
UNITED STATES PATENTS

| | | |
|---|---|---|
| 2,886,094 | Pickles | May 12, 1959 |
| 2,930,428 | De Rose | Mar. 29, 1960 |
| 2,931,424 | Pickles | Apr. 5, 1960 |